United States Patent [19]

Joffe et al.

[11] Patent Number: 4,995,076

[45] Date of Patent: Feb. 19, 1991

[54] CALL PROGRESS CAPABILITY FOR A SWITCHED CHANNEL DATA SERVICE UNIT

[75] Inventors: Daniel M. Joffe, North Plainfield; Charles R. Eberle, Jr., Rockaway, both of N.J.

[73] Assignee: Integrated Network Corporation, Bridgewater, N.J.

[21] Appl. No.: 477,760

[22] Filed: Feb. 9, 1990

[51] Int. Cl.$^5$ .................... H04M 1/26; H04M 3/22
[52] U.S. Cl. .................................... 379/257; 379/229; 379/237
[58] Field of Search ................. 379/229, 351, 257, 237

[56] References Cited

U.S. PATENT DOCUMENTS 4,028,493 6/1977 Brennemann et al. ............. 379/257
4,667,065 5/1987 Bangerter ............................ 379/351
4,696,031 9/1987 Freudberg et al. ................. 379/257

*Primary Examiner*—Stafford D. Schreyer
*Attorney, Agent, or Firm*—Hamilton, Brook, Smith & Reynolds

[57] ABSTRACT

A means is provided within an interface to data terminal equipment for obtaining call progress information. The call progress information provides relevant data as to the progress of a call initiated by the data terminal equipment. The interface is designed to be used in a portion of the telephone network that lacks byte alignment. Such portions of the telephone network do not currently receive call progress tones. The interface is preferably a data service unit that includes a receiving means processor and a display means. The data service unit interprets signals sent from the DDA/OCU that encode the progress or absence of call progress tones sent from the destination node of an initiated call.

28 Claims, 4 Drawing Sheets

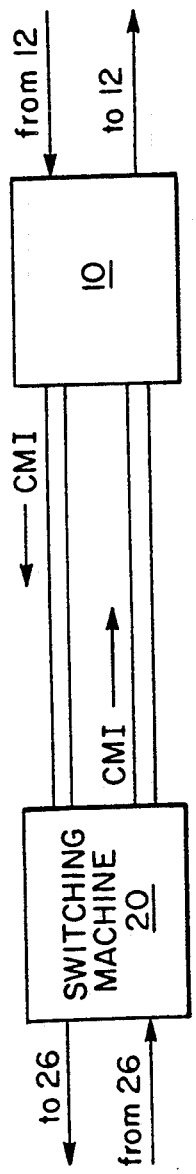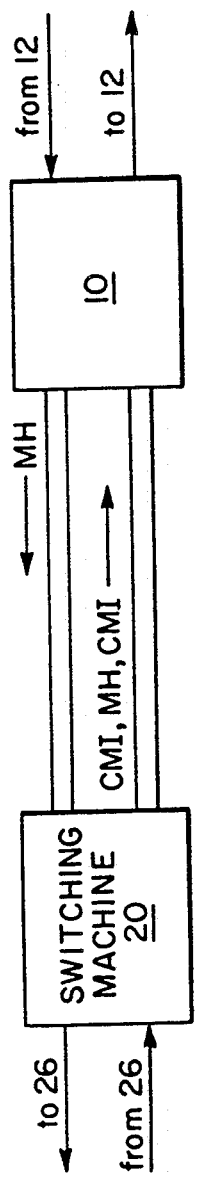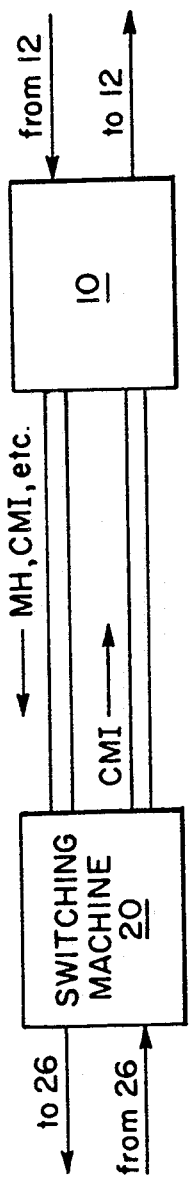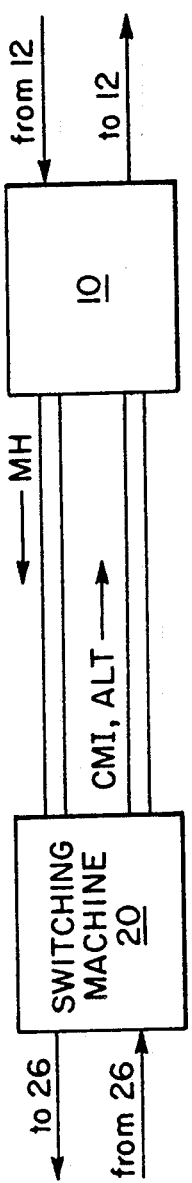

CALL PROGRESS CAPABILITY FOR A SWITCHED CHANNEL DATA SERVICE UNIT

BACKGROUND OF THE INVENTION

With the advent of increasing demands for inter-processor sharing of data, it has become desirable to be able to transmit large amounts of data from one processor to another processor over telephone lines. To facilitate the transmission of such large amounts of data, telephone lines have been adapted to carry data communications in digital form. Prior to this adaptation, telephone lines running from customers' premises were designed to carry only low frequency voice communications.

The local access arrangement, which comprises customer premises equipment (CPE) and metallic telephone wires, must be enhanced to accommodate such high speed digital communications such as needed for inter-processor communication. Once such enhancement has been completed, the CPE has access to the facilities of existing all digital switching networks such as the Accunet ® facilities. Recently, the enhancements to the local loop facilities have taken the form of switched channel data service units (DSU) which are installed at the CPE to enable full duplex communication at a high bit rate (i.e., 56 kilobits per second, or a sub-multiple thereof). The communications travel from the customer's data terminal equipment (DTE) through the DSU where they are converted for transmission over four wire telephone lines to the digital switching network.

The digital switching network equipment operates in a synchronous mode, wherein the framing of bytes is maintained throughout the network by a master reference clock. The CPE, however, receives no byte boundary information. Therefore, synchronization problems arise in communications between the network and the CPE. One such problem is the present lack of call progress information when setting up a communication via the digital switching network from a data terminal at one CPE node to a destination CPE node. Call progress information is conventionally obtained in an analog voice communication system by listening over the phone handset to call progress tones. These tones include the dial tone, the line busy signal, the ring back signal, the trunk busy signal and other call progress tones.

A need exists for a similar system for all digital communications between data terminals over a digital network.

Presently, direct digital access office channel units (DDA/OCU), located at telephone company offices, interface the digital switching network with the local loop. The interfacing is accomplished by translating the bit stream from the network (i.e. DS-0 bit stream (64 Kbps)), into a lower bit rate format (i.e., 56 Kbps) for transmission to the CPE. The 8 Kbps differential is used for signalling and network maintenance. The 56 Kbps format stream is then carried over the four wire local loop to the interface switched channel data service unit at the CPE and thence, to the DTE.

Within the digital switching network, certain tones called "call progress tones" (CPT's) are used to indicate the progress of communication during a call setup period. Presently, in communication between the switching network and the DTE, the state of the A and B signalling bits is used to indicate "on hook" or "off hook" conditions. These signalling bits are found in the eighth bit of signalling frames of the network T1 carrier. (See A.T.T. Pub. 43801, "Digital Channel Bank Requirements and Objectives", Nov., 1982.)

When these bits indicate an "on hook" condition, a control mode idle (CMI) bit pattern is continuously transmitted from the DDA/OCU of the network system to the DSU. After the calling party has completed dialing and until the called party answers, the calling party receives only CMI ("on hook") signals. There is no way to determine the call progress because of this characteristic of the network.

This lack of call progress information can be especially troubling as there is no way to distinguish between calls which have failed due to busy conditions, either line or trunk, and calls which are ringing through but which are just not being answered.

SUMMARY OF THE INVENTION

In accordance with the present invention, a call progress protocol is established in which the OCU generates two types of "on hook" signals. The first "on hook" signal generated by the OCU is the CMI signal which signifies an "on hook" condition with no tone present. The second "on hook" signal generated by the OCU is called the "ALT" for "alternative" signal. The ALT signal signifies an "on hook" condition with tones present.

In the idle state, the call initiating DSU receives and sends CMI ("on hook") signals. After dialing is completed and before the far end answers, the initiating DSU receives either CMI or ALT signals. Upon receipt by the OCU of CPT back from the network, the OCU generates a stream of mostly ALT sequences with occasional bursts of CMI frames interspersed. During the silent intervals of CPT, the DTE receives a stream of CMI signals.

Call progress is determined by the timing of the tone intervals versus the silent intervals as represented by the ALT/CMI bit streams.

The two types of signals, i.e., the ALT signal and the CMI signal, may be provided by a mapping from the digitally encoded tones carried by the network. This may be Mu-law, A1 law, or any other similar encoding scheme; the current encoding used in North America is Mu-law. The absence of a digitally encoded tone is evidenced by encoded signals that lie within a range of amplitudes surrounding zero, and the presence of a tone is evidenced by the encoded signals that lie outside that range. The duration of the first and second type of signals is proportional to the duration of the absence and presence of digitally encoded tones, respectively, A "ring-back" tone indicating ringing on the destination node is represented by the sequence 2 seconds of ALT, 4 seconds of CMI and 2 seconds of ALT, etc. A line busy tone is represented by 0.5 seconds of ALT, 0.5 seconds of CMI, 0.5 seconds of ALT and 0.5 seconds of CMI. A trunk busy tone is represented by 0.25 seconds of ALT, 0.25 CMI, 0.25 ALT, 0.25 CMI, etc.

In a preferred embodiment, the CMI bit pattern is a 7-bit bipolar violation sequence (BBBBX0V), where B is a binary 1 in bipolar format, X as influenced by the other bits may be a 0 or 1, and V is a bipolar violation bit. The ALT bit pattern is NBOBX0V where N is a don't care value that may be either a B or a zero.

The access interface of the switched channel data service unit (DSU) should include a receiver for receiving the signals such as call progress information from the telephone network. The interface should also include a processor for processing the received signals to discern their significance. Lastly, the interface may include a display means for displaying the call progress information derived from the status signals. This display may be any of a variety of different types, but one preferable implementation is a liquid crystal display. The call progress information may also be forwarded to a data link or to control leads that generates activity in response to the call progress information.

BRIEF DESCRIPTION OF THE DRAWINGS

FIGS. 4a, 4b, 4c and 4d depict the sequence of digital signals generated when a call is initiated.

DETAILED DESCRIPTION OF THE PREFERRED EMBODIMENT

Figure 1:
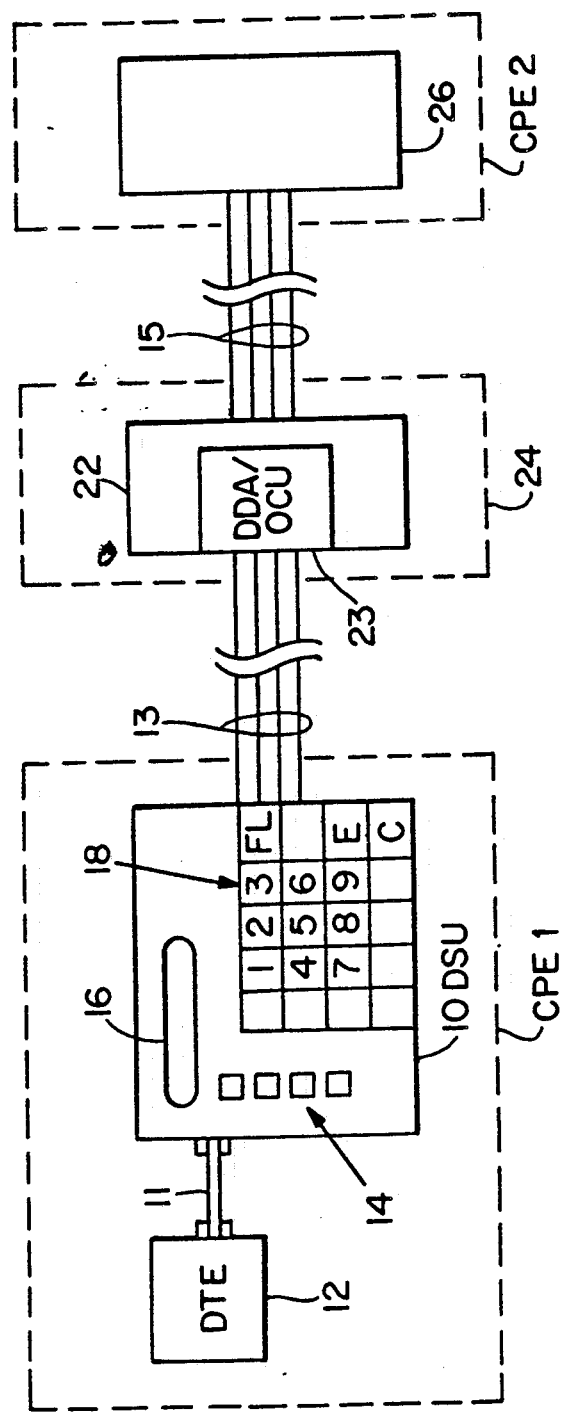
FIG. 1 is a block diagram of a digital data system with call progress capability.

FIG. 1 depicts a typical configuration for the present invention. The configuration includes Customer Premises Equipment CPE1 such as data terminal equipment 12 that is located at a first node. The CPE1 has a switched channel data service unit 10 that enables communication over network 24. The network is also coupled to Customer Premises Equipment CPE2 at a second node positioned in a remote location. The switched channel data service unit (DSU) 10 is connected by a standard computer interface 11 to data terminal equipment (DTE) 12 such as a host computer. It should be appreciated, however, that the switched channel data service unit 10 may be alternatively coupled to other types of DTE. The DSU 10 provides an interface for the data terminal equipment 12 with the telephone switching network 24 via four wire full duplex transmission lines 13.

In accordance with a preferred embodiment of the present invention, the DSU 10 (FIG. 1) provides call progress information to a user of DTE 12 when a call is initiated from the DTE 12. The DSU 10 is designed for use in an environment that lacks byte alignment such as a 56 Kbps network. The call progress information provides useful status updates with respect to calls placed by the DSU 10 for the DTE 12. The call progress information is transmitted to the switched 56 Kbps network of the DSU 10 as a sequence of signals. The DSU 10 interprets the sequence of signals transmitted in 56 Kbps form to discern and to display appropriate call progress information and take additional appropriate action if necessary.

The DSU includes a liquid crystal display (LCD) 16 upon which the call progress information is displayed. The LCD may display up to forty characters. Also provided is a set of Light Emitting Diode (LED) displays 14 that indicate the current status of the unit 10. Lastly, a keypad 18 is provided for selecting functions and for dialing telephone numbers.

The call progress information is exhibited on the display 16 after dialing is completed from the DSU 10 while the DSU is awaiting an answer from the far end 10. It should be noted, nevertheless, that status information other than call progress information is shown on the display during the remainder of operation of the DSU 10. In addition, it should also be noted that the call need not be made by the DSU 10, but rather, it may be made by other means. However, for purposes of simplicity and clarity, the remainder of the discussion will assume the DSU 10 initiates the call.

A switching machine 22 resides within the digital voice network. This switching machine 22 is typically within a central office for the local loop that provides service to the data terminal equipment through the DSU. The switching machine 22 includes a direct digital access (DDA)/office channel unit (OCU) 23. It should be noted, however, that the DDA/OCU 23 need not reside exclusively within the switching machine 22. Rather, in alternative configurations of the present invention, the DDA/OCU 23 resides elsewhere in the network 24. In one such configuration, however, another local loop consisting of a four wire line 15 and a destination node 26 is coupled to the other side of the network 24. The local loop configuration described herein is purely illustrative and is not intended to restrict the scope of the present invention in any manner. The node is equipment such as a data terminal unit with an interface to the network 24 by means of compatible technology.

When a call is placed from such a DSU 10 in current systems, the party placing the call is not aware of the progress of the call. In particular, the party does not know whether the destination line is busy, whether there is no answer or whether the call has been properly received. This is because the OCU 23 merely sends the CMI signal to the calling DSU when it receives an "on hook" signalling condition from the network 24. The present invention overcomes the problem of obtaining call progress information by providing a mapping of the Mu-law tones at the switching machine 22 into a sequence of signals.

In current systems, the DDA portion of the DDA/OCU 23 monitors the data stream to recognize "on hook" and "off hook" status of the destination. When the destination 26 is in an "on hook" condition, the DDA/OCU masks the Mu-law encoded status tones sent from the network 24. In particular, the DDA/OCU receives the 64 kilobits per second data stream that encodes the tone and substitutes the tones with CMI signals in a format appropriate for transmission over a four wire line 13 to the initiating DTE.

The terms "off hook" and "on hook" are used throughout this application. These terms originated in an analog voice communication setting. In that context, "off hook" refers to when a telephone is off its receiver. "On hook", in contrast, refers to when a telephone is on its receiver. In the data communications setting, the terms refer to the active and inactive states, respectively. The CMI signal, representing an "on hook" state, is represented by the seven bit bipolar violation sequence of BBBBX0V. As such, digitally encoded call progress tones are blocked from calling the DSU by the OCU portion of the network 24.

Another signal generated by current systems is the Mark Hold (MH) signal. This variety of signal is generated when the destination line is in an "off hook" condition as indicated by the signalling bits. Both the CMI and MH signals are also generated by the OCU 23.

The present invention alters the current scheme of transmitting signals to provide a different mapping of call progress tones from the DDA/OCU 23. Mapping in this context refers to the translation of digitally encoded tones received by the DDA/OCU 23 into corresponding sequences of CMI and ALT signals, where CMI is represented by the sequence BBBBX0V and ALT by the sequence N0BX0V. As such, the digitally encoded tones are "mapped" into CMI and ALT signals. The mapping of interest occurs only when the DSU 10 is "off hook" and the destination node 26 is "on hook". The major modification used to implement this alternative mapping is the addition of an alternative signal designated as ALT.

Figure 2A:
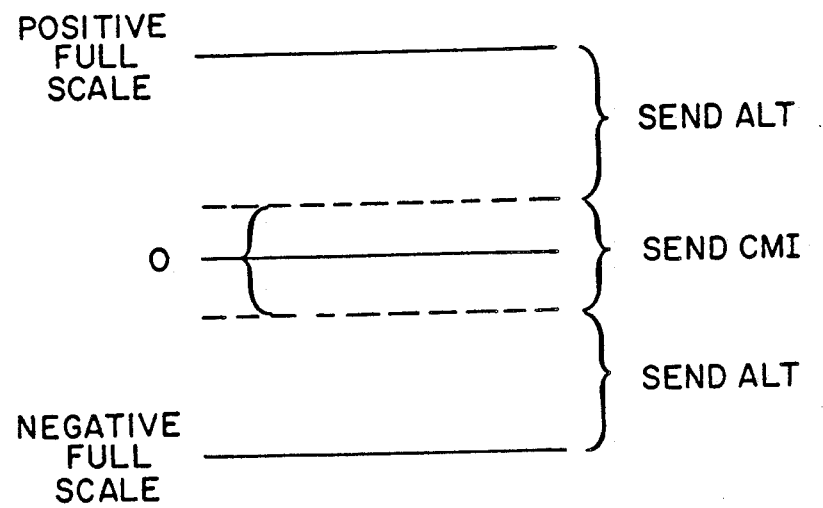
FIG. 2a and 2b depict how Mu-law encoded call progress tones are encoded into corresponding CMI and ALT signals.

The ALT signal is produced by the DDA/OCU 23 when the status tones received from the network 24 as Mu-law encoded signals have amplitudes that lie outside a band near zero on the Mu-law scale. An exemplary range of amplitudes that are mapped by the DDA/OCU 23 as ALT signals and a corresponding exemplary range of amplitudes that are mapped by the DDA/OCU 23 as CMI signals are depicted in FIG. 2a for a binary Mu-law scale between $-128$ and $+128$. The band of CMI-mapped amplitudes is located in the inner region of the scale, and the band of ALT-mapped amplitude is located in the regions that lie outside the inner region of the scale. The inner region of the scale (mapped as CMI signals) includes companded codes having the pattern S00XXXH, where S is the sign, X is either a zero or a one, H is the A or B signalling bit in every sixth frame, and H is either a zero or a one. The other regions of the scale include all other companded codes.

Thus, based upon the magnitude of Mu-law tones received, the DDA/OCU 23 generates either a CMI or an ALT signal. The CMI signal is an indication of the absence of tone. The band of amplitudes of tone that generate CMI signals is defined to encompass Mu-law values near zero as well as zero to provide the leeway necessary to account for noise. Conversely, the ALT signal is an indication of the presence of tone. The code for the ALT signal is N0BBX0V. The duration of the CMI and ALT signals matches the duration of the silent intervals and the tones.

Figure 2B:
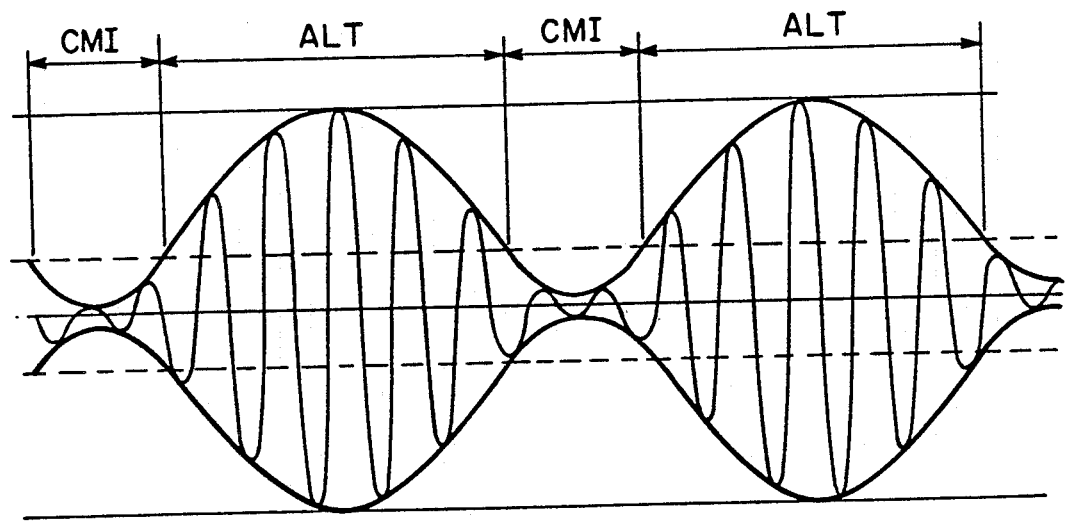

Included in the switched channel DSU is a means for filtering the incoming sequences of CMI and ALT. It should be recalled that sequences of ALT represent the presence of tone. Within that tone, however, will be a small numbers of CMIs corresponding to the zero crossings to the network call progress tones (FIG. 2b). With the chosen threshold for CMI/ALT and the level of call progress tones, the small numbers of CMIs can be filtered out, while still leaving the determination of the overall envelope of the call progress tone timing intact. While this filtering could be accomplished in either the OCU or the switched channel DSU, in this embodiment, we have placed it into the DSU.

Similarly, it should be recalled that sequences of CMI represent the absence of tone. Filtering has been added so that noise (e.g. clicks or pops during switching transitions) do not falsely trigger the call progress detection algorithm.

Subsequent references to ALT and CMI in the context of call progress timing analysis refer to groups of like signals that form the envelopes rather than single bytes on sets of bits that comprise a single ALT or CMI event.

Figure 3A:
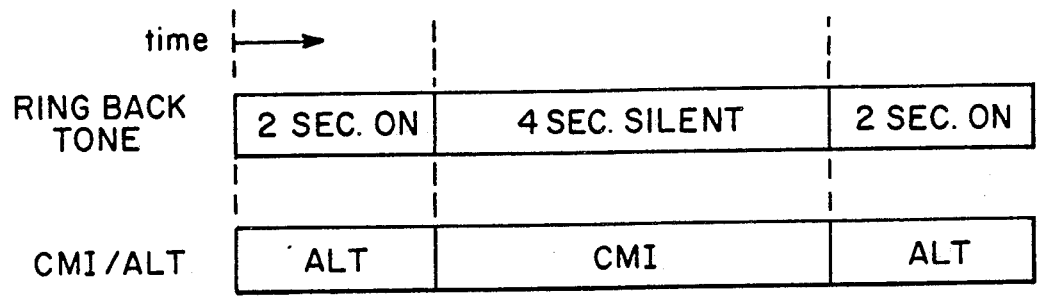
FIGS. 3a, 3b and 3c depict the timing of ALT and CMI signals for different call progress tone sequence.
Figure 3B:
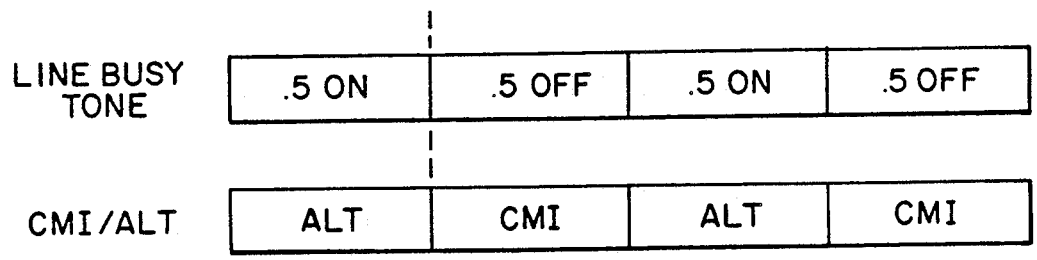
Figure 3C:
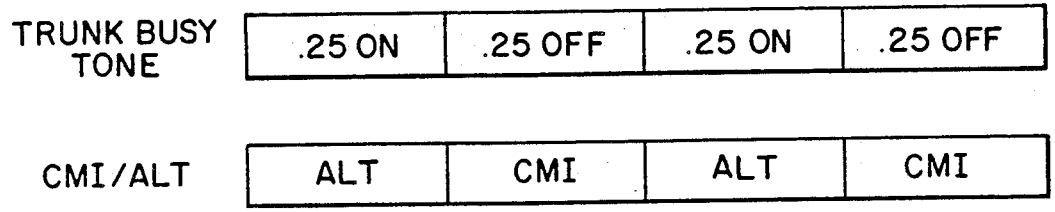

FIGS. 3a, 3b and 3c depict how this mapping of ALT and CMI signals can be used to discern call progress information. The DSU 10 contains a processor and firmware that interpret the ALT and CMI signals. The digital voice network 24 provides status tones that indicate the state of the call progress. FIG. 3a depicts the pattern received at the calling station when the destination node 26 is being alerted of the presence of an incoming call. This pattern of tones is familiar to anyone who has ever placed a telephone call and heard the ring back tone. This pattern of tones consists of two seconds of tone followed by four seconds of silence followed by a subsequent two seconds of tone. The pattern of alternating tones of these specified durations uniquely identifies the ringing from other call progress information. This pattern is repeated until the line is answered.

The DDA/OCU 23 maps the tones into two seconds of ALT which is, in turn, followed by four seconds of CMI followed by two seconds of ALT. The resulting pattern is interpreted by the processor of the DSU 10 as ringing. The DSU 10, thus, generates a message: "Dialing complete, Far End ringing" that is displayed on the liquid crystal display 16. This message remains until the far end answers the call. After 75 seconds or after intervention of the operator, the call is terminated.

Similarly, FIG. 3b depicts the mapping of a call progress busy tone on the line. This tone consists of a half of a second of tone followed by a half of a second of silence. The presence of tone is mapped to an ALT signal, and the absence of tone is mapped to a CMI signal. Like the ringing, the busy signal tone is interpreted by the data service unit 10 to generate a message that is displayed on the LCD display 16. Specifically, the message "Busy Line" or an equivalent message is shown.

Yet another capability provided by the present invention is to indicate when the trunk coupled to the destination node 26 is busy. The call progress sequence generated when the trunk is busy consists of a 0.25 interval of tone followed by a 0.25 interval of silence. This pattern results in a alternating mapping of ALT and CMI signals of 0.25 seconds in duration. The DSU 10 receives this sequence of alternating ALT and CMI signals and displays the message "Trunk busy" or an equivalent message.

The steps involved when a call is initiated are shown in FIGS. 4a, 4b, 4c and 4d. In particular, initially the DSU 10 and destination node 26 are "on hook"; thus, CMI signals are sent from both the DSU 10 and the destination node 26 via the switching machine 22. FIG. 4b depicts what happens when a call is ready to be placed by the DSU 10. In particular, when a call is initiated, the DSU becomes "off hook" by sending it toward the network 24. The DSU 10 may become "off hook" by depressing the F3 ENTR key which is included in the keyboard. The DSU 10 then displays a message such as "Call Originate (Wink)". This message indicates that the DSU 10 is waiting for a wink from the network to indicate that the network is ready to receive the call.

The wink returned by the network 24 comprises a single MH signal of short duration. As depicted in FIG. 4b, a CMI signal is sent by the DDA/OCU 23 in the switching machine 22 followed by a MH signal which is, in turn, followed by another CMI signal. The single burst of MH signals represents a wink to the DSU 10 indicating that the network 24 is ready to receive the digits of the number to be dialed. Should the network fail to return a wink after a reasonable time, an error message such as "Network Err: No Wink" is displayed.

Once the appropriate wink has been received by the DSU 10, the phone number of the destination node 26 is dialed. The digits when dialed are displayed on the LCD display 16. In accordance with standard telephone system procedure, the digits are encoded as a series of MH and CMI signals. As the DSU 10 is dialing, the switching machine 22 sends back CMI signals.

In the last stage of this process, as depicted in FIG. 4d, one of the call progress sequence of signals (such as these previously described in FIGS. 3a, 3b and 3c) is returned to the DSU 10. The DSU 10 interprets the sequence and displays the appropriate message. If the call is answered, a MH and/or data signal is sent from the destination and a message such as "Call Established Far End Answer" is displayed. The call has then been successfully completed and the need for call progress information no longer exists.

EQUIVALENTS

While this invention has been shown and described with reference to a preferred embodiment thereof, it will be understood by those skilled in the art that various changes in form and details may be made therein without departing from the spirit and scope of the invention as defined by the appended claims. For instance, different bit encodings for the CMI and ALT signals are possible. In addition, the call progress information need not be sent only to the display; rather, it may, likewise, passed to control leads in the DSU, forwarded to the DTE, or used by the DSU to take alternative actions. Furthermore, different thresholds may be used for the ALT/CMI transistion point. Moreover, filtering schemes need not be performed exclusively by the DSU. In alternative configurations of the present invention, the filtering is performed within other network or DTE elements.

We claim:

1. In a telephone network, a method of obtaining call progress information for a call placed from a first node to a destination node wherein the first node lacks byte alignment, comprising the steps of:
   (a) providing a bit sequence of digitally encoded tones from the network that indicates progress of the call;
   (b) issuing a first type of signal whenever there is an absence of digitally encoded tone in the sequence;
   (c) issuing a second type of signal whenever there is digitally encoded tone present in the sequence; and
   (d) interpreting a resulting sequence of first type signals and second type signals to discern call progress information.

2. A method as recited in claim 1 wherein the interpreting is done by a data service unit.

3. A method as recited in claim 1 wherein the call is placed from a location that provides 56 kilobits per second service.

4. A method as recited in claim 1 wherein the sequence of first type signals and second type signals is interpreted as indicating that the destination line is busy.

5. A method as recited in claim 4 wherein the sequence of first type signals and second type signals is comprised of an alternating sequence of a first type signal having a duration 0.5 seconds followed by a second type signal having a duration of 0.5 seconds.

6. A method as recited in claim 1 wherein the sequence of first type signals and second type signals is interpreted as indicating that the destination line is ringing.

7. A method as recited in claim 6 wherein the sequence of first type signals and second type signal is comprised of an alternating sequence of a first type signal having a duration of four seconds followed by a second type signal having a duration of two seconds.

8. A method as recited in claim 1 wherein the sequence of first type signals and second type signals is interpreted as indicating that a trunk for the destination line is busy.

9. A method as recited claim 8 wherein the sequence of first type signals and second type signals is comprised of an alternating sequence of a first type signal having a duration of 0.25 seconds followed by a second type signal having a duration of 0.25 seconds.

10. A method as recited in claim 1 wherein the sequence of first type signals and second type signals are interpreted as indicating that the destination line has answered the call.

11. A method as recited in claim 1 wherein a duration of the absence of tones in the sequence of digitally encoded tones determines a duration of corresponding signals of the first type, and duration of the presence of tones in the sequence of digitally encoded tones determines duration of corresponding signals of the second type.

12. A method as recited in claim 1 wherein the digitally encoded tones are Mu-law encoded tones.

13. A method as recited in claim 12 wherein the absence of a digitally encoded tone is evidenced by Mu-law encoded signals that lie within a range surrounding zero.

14. A method as recited in claim 13 wherein the presence of a digitally encoded tone is evidenced by Mu-law encoded signals that lie outside the rang surrounding zero.

15. A method as recited in claim 1 wherein the call is placed to a destination line residing in a voice network portion of the telephone system.

16. In a telephone network, an interface for interfacing data terminal equipment with a portion of the telephone network that lacks byte alignment, comprising:
   (a) a receiver for receiving signals from the telephone network including signals that encode call progress information;
   (b) a processor for processing received status signals to determine their significance; and
   (c) a display for displaying the call progress information derived from the status signals by the processor.

17. An interface as recited in claim 16 wherein the receiver receives the signals in a 56 kilobits per second serial format.

18. An interface as recited in claim 16 wherein the display is a liquid crystal display.

19. An interface as recited in claim 16 wherein the processor determines the significance of received status signals by examining the sequence of signals and comparing the sequence to established sequences having predetermined meaning regarding call progress status.

20. A switched channel data service unit, comprising a processing means for receiving a sequence of digital signals that are not byte aligned from a switching machine, wherein the sequence of digital signals originate in response to a call placed by the switched data service unit and for analyzing said sequence of signals to derive call progress information.

21. In a telephone system having a digital voice network that includes a DDA/OCU unit, a switched channel data service unit coupled to data terminal equipment and the DDA/OCU unit, comprising:

(a) a signal receiving means for receiving a sequence of signals from the DDA/OCU, wherein said sequence of signals is generated by the DDA/OCU unit in response to monitored digitally encoded tones produced from the network when a call is placed to a called party node;
(b) a processor for processing the sequence of signals to discern call progress information concerning initiated calls; and
(c) a calling party node for receiving call progress information from the processor and acting accordingly.

22. A switched channel data service as recited in claim 21 wherein the calling party node comprises a display for displaying call progress information to a user of the data terminal equipment.

23. A switched channel data service unit as recited in claim 21 wherein the calling party node comprises control leads for generating activity in response to call progress information.

24. A switched channel data service unit as recited in claim 21 wherein the calling party node comprises a data link.

25. A switched channel data service unit as recited in claim 21 further comprising a call initiating means for initiating calls to called party nodes.

26. A method of providing call progress information to a user of data terminal equipment that is interfaced to a telephone network and that lacks byte alignment, comprising the steps of:
(a) initiating a call from the data terminal equipment to a calling party node;
(b) monitoring signals generated from the network to produce a sequence of digital signals that characterize the response of the called party node to the call; and
(c) interpreting the sequence of digital signals to generate call progress information.

27. A method as recited in claim 26 wherein the signals produced from the telephone network are digitally encoded tones.

28. A method as recited in claim 26 wherein each signal in the sequence of digital signals has a duration equal to a corresponding signal of the signals generated from the telephone network.

* * * * *

UNITED STATES PATENT AND TRADEMARK OFFICE
CERTIFICATE OF CORRECTION

PATENT NO. : 4,995,076

DATED : February 19, 1991

INVENTOR(S) : Daniel M. Joffe and Charles R. Eberle, Jr.

It is certified that error appears in the above-identified patent and that said Letters Patent is hereby corrected as shown below:

Col. 8, line 31, delete "rang" and insert ---range---.

Signed and Sealed this

Thirtieth Day of June, 1992

Attest:

DOUGLAS B. COMER

Attesting Officer

Acting Commissioner of Patents and Trademarks